L. K. LAURSEN.
SANITARY COOKING TABLE.
APPLICATION FILED NOV. 8, 1915.
1,263,683.
Patented Apr. 23, 1918.
2 SHEETS—SHEET 1.
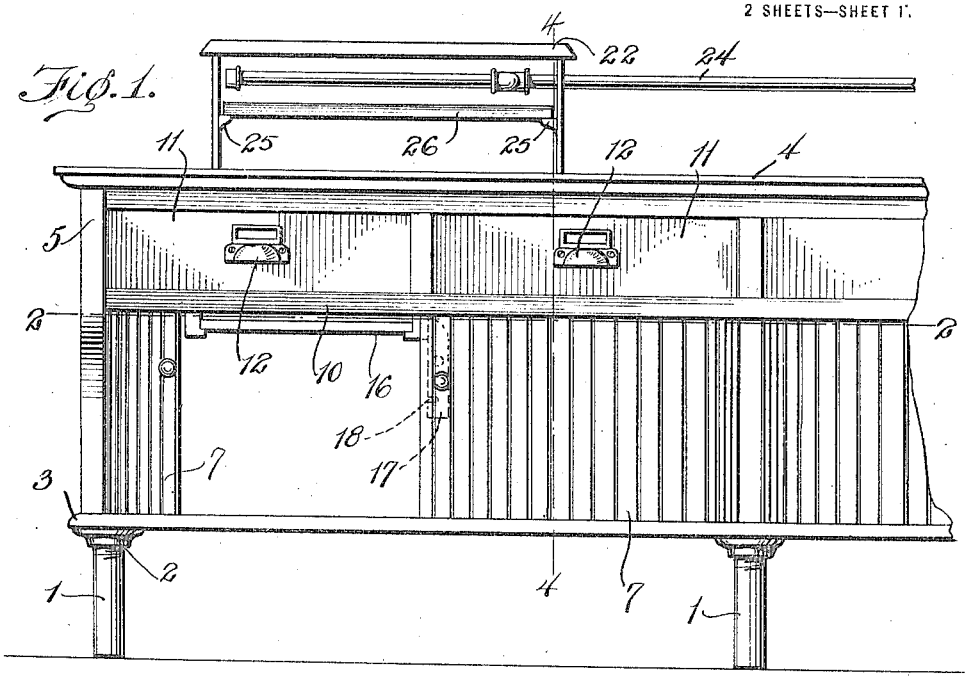
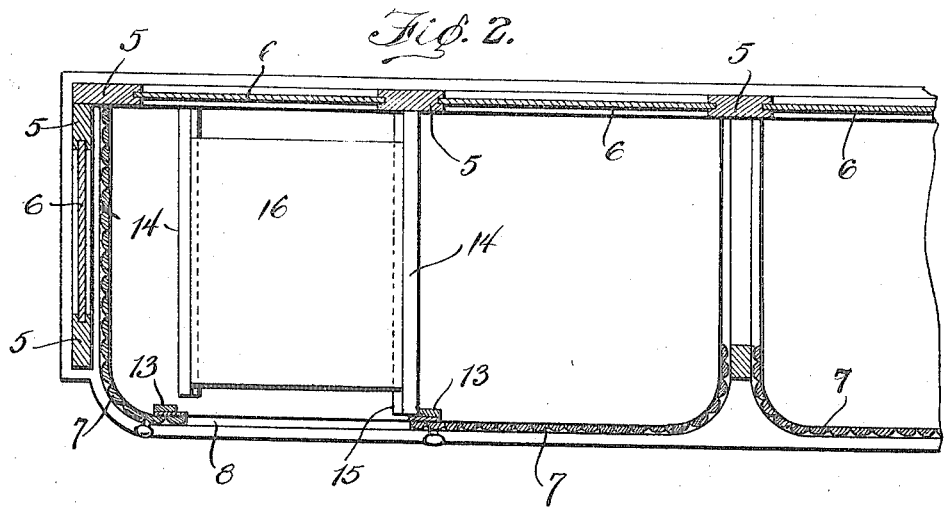
WITNESSES
Wm. H. Mulligan
W. S. Fowler
INVENTOR
Laust K. Laursen
BY Richard Owen
ATTORNEY

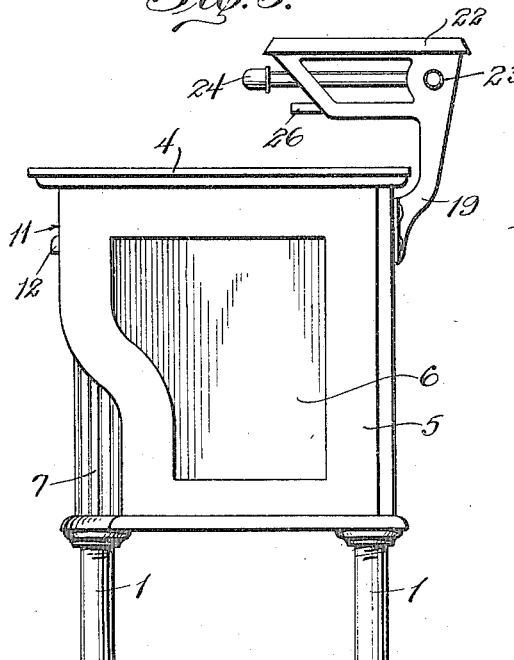
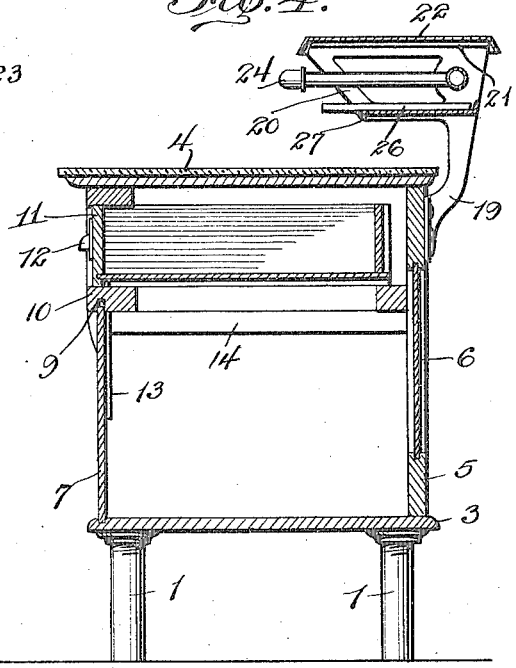
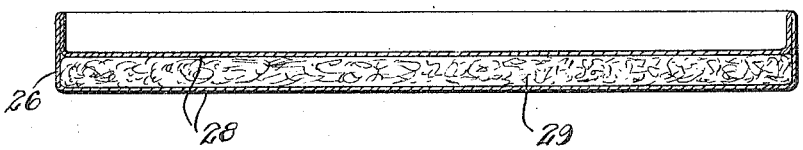
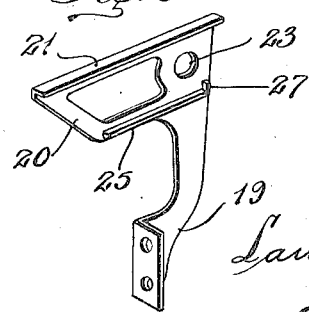

UNITED STATES PATENT OFFICE.

LAUST K. LAURSEN, OF SAN ANTONIO, TEXAS.

SANITARY COOKING-TABLE.

1,263,683.

Specification of Letters Patent. Patented Apr. 23, 1918.

Application filed November 8, 1915. Serial No. 60,329.

*To all whom it may concern:*

Be it known that I, LAUST K. LAURSEN, a citizen of the United States, residing at San Antonio, in the county of Bexar and State of Texas, have invented certain new and useful Improvements in Sanitary Cooking-Tables, of which the following is a specification.

This invention has relation to certain new and useful improvements in sanitary cooking tables, and has for its primary object, the provision of a sanitary cooking table which will be specially adapted for use in cooking schools.
The invention has for another object, the provision of a domestic cooking table of this character which will be of simple construction and compact form and above which a conventional form of cook stove may be supported in such manner as not to interfere with the preparation of the food upon the table top.

The invention has for still another object, the provision of a table of this character in which the doors of the main compartment thereof will be of such construction that they may be readily separated and moved to the ends of the compartment to permit the withdrawal of the bread board from the supports provided for the same within said main compartment.

The invention has for a further object, the provision of a cooking table of this character in which the doors will be of novel form and may be readily removed or secured in position, and when open, will not project beyond the table.

The invention has for still another object the provision of an improved and novel form of supporting bracket for the cook stove and a heat reflecting drip pan positioned beneath the cook stove so that the supporting brackets will be spaced from the edge of the table top and the table will be protected from heat and drippings from the stove caused by boiling over of the contents of the cooking vessels upon the stove.

With the above and other objects in view, the invention resides in the novel construction and arrangement of parts as herein- after set forth in the specification, pointed out in the claim, and shown in the accompanying drawings, in which—

Figure 1 is a front elevation of my improved domestic cooking table with a portion thereof broken away;

Fig. 2 is a transverse horizontal section on the plane of line 2—2 of Fig. 1;

Fig. 3 is an end elevation of the device;

Fig. 4 is a transverse vertical section on the plane of line 4—4 of Fig. 1;

Fig. 5 is a longitudinal vertical section through my improved form of heat reflecting drip pan;

Fig. 6 is a perspective view of one of the stove supporting brackets removed.

Referring to the drawings in which similar reference characters designate corresponding parts throughout the several views, 1 designates the supporting legs which are threaded into suitable sockets 2 mounted on the bottom 3 of my improved form of the cooking table so that the legs 1 may be readily adjusted to bring the bottom 3 and table top 4 to horizontal position even though the floor or other supporting surface upon which the legs 1 rest may not be perfectly level.

The table top 4 is supported above the bottom 3 by the suitable corner front and back uprights 5, certain of which are connected by the back and end panels 6 having their edges secured therein in any suitable manner, such as shown in the drawings.

The front of the lower portion of the table is closed by the sliding doors 7 when the front vertical edges of said doors 7 are drawn together at the center of said table. When it is desired to open the main compartment of the table, however, the doors 7 are moved to open position by sliding the same in the lower groove 8 provided in the upper face of the bottom 3 and the upper grooves 9 in the upper horizontal rails 10 above said doors 7. The doors 7 are preferably formed of connected vertical slats so that the doors may readily ride in the lower guide grooves 8 and upper guide grooves 9 from closed position to open position, the guide grooves 8 and 9 being turned at the front corners of the table and extended at a right angle so that when the doors 7 are in open position they are at the opposite ends of the table and parallel with the end panels 6.

The rails 10 serve to support the drawers 11 which slide upon the same and have suitable handles 12 by means of which they may be readily opened and closed. The table top 4 may be formed of any suitable material but is preferably formed of a heavy plate of glass and extends over the edges of the table, the plate of glass being suitably secured against movement to prevent it from sliding off the table.

When the doors 7 are in closed position, the pivoted stop members 13 mounted upon the inner faces thereof and adjacent the outer or front vertical edges thereof, are engaged with the opposite sides of the extended forward end of one of the transverse breadboard supporting rails 14 suspended in the upper portion of the main compartment of the table and having inner supporting flanges 15 to support the breadboard 16 just below the horizontal rail 10. When it is desired to remove the doors 7, the pivoted stop members 13 are turned to horizontal position so as to permit them to pass beneath the extended end of the first-mentioned transverse breadboard supporting rail 14 until the entire door is in the front portion of the grooves 8 and 9 when it may be readily raised in the groove 9 until the lower edge is free from the groove 8 and may be readily swung outwardly beyond the edge of the bottom 3 and the door then withdrawn from the groove 9, it being understood that the groove 9 is somewhat deeper than the groove 8. It will also be seen that the door may be again placed in position by first inserting the upper edge thereof in the groove 9, then raising the door and swinging the lower edge thereof to position above the groove 8 and permitting the door 7 to lower until said lower edge thereof is properly positioned within the groove 8. The stop members 13 are provided in one face with suitable recesses 17 to receive the stop pins 18 which serve to limit swinging movement of said stop members 13 in one direction thereby making it impossible for the stop members 13 to pass the extended end of the first-mentioned breadboard supporting rail 14 when the stop members 13 are in operative position.

By referring to Figs. 1 and 2 of the drawings it will be readily seen that this table is preferably formed in sections and I have described only one section, as each section may be considered a separate and complete table, and, if desired, each section may be formed separately.

In order to properly support the conventional form of flat cook stove above each table or each table section, I have provided a pair of brackets 19 which are secured to the rear face of the table, the brackets being of such form as to extend outwardly beyond the rear edge of the table top 4 and then project upwardly and terminate in forwardly extended portions 20 upon the upper edges of which are formed the horizontal flanges 21 to support the plate or frame of a conventional form of cook stove 22, as clearly shown in Figs. 1, 3, 4 and 6. The brackets 19 also have suitable pipe openings 23 in the upper portions thereof, through which the gas supply pipe 24 for the cook stove 22 extends. The brackets 19 also carry suitable lower flanges 25 upon their inner faces to support the heat reflecting drip pan 26, said flanges 25 having suitable upstanding stops 27 formed upon their rear ends to prevent the drip pan 26 from being moved over said rear ends of the flanges 25.

While any form of drip pan may be employed I prefer to use the form of drip pan shown in section in Fig. 5 and consisting of lower and upper bottoms 28 spaced apart and having filling 29 of asbestos or the like therebetween, the upper bottom 28 being formed by extending downwardly the edges of the drip pan and continuing the same over the entire lower bottom 28. This form of drip pan will protect the table top 4 from the heat generated by the cook stove 22, as well as the drippings from the boiling over of the contents of the cooking utensils upon said stove 22. From the foregoing, it will be readily seen that I have provided an improved and novel form of cooking table and that when one of the doors 7 is in open position, the breadboard 16 may be readily withdrawn or placed in position and ready access may also be had to the main lower compartment of the cooking table. It will also be understood that the doors 7 may be varied as desired in construction and the construction and arrangement of the parts may be varied to permit the doors 7 to slide vertically, if preferred. It will also be understood that many other minor changes in the details of construction and arrangement of parts may be resorted to within the scope of the appended claim without departing from the spirit of the invention or sacrificing any of the advantages of the same.

What is claimed is:

A cooking table comprising a bottom and a top spaced apart, a back and sides inclosing a space between said bottom and top, a rail attached at its ends to said sides between and parallel to the bottom and top, doors positioned between said rail and said bottom adapted to slide toward and away from one another, said rail and said bottom having guide grooves for the doors formed therein, slides for a breadboard below the bottom of said rail, one of said slides being extended to form an abutment for the doors when closed, and pivoted stop members carried by said doors for engagement with said abutment.

In testimony whereof I affix my signature in presence of two witnesses.

LAUST K. LAURSEN.

Witnesses:
PETER L. PETERSEN,
M. E. BUCKLEY.

Copies of this patent may be obtained for five cents each, by addressing the "Commissioner of Patents, Washington, D. C."